United States Patent [19]
Oh

[11] Patent Number: 5,568,481
[45] Date of Patent: Oct. 22, 1996

[54] COMMUNICATION LINE ADAPTER AND THE METHOD THEREOF

[75] Inventor: Yun S. Oh, Seoul, Rep. of Korea

[73] Assignee: Korea Telecom Co., Ltd., Seoul, Rep. of Korea

[21] Appl. No.: 146,221

[22] Filed: Nov. 1, 1993

[30] Foreign Application Priority Data

Nov. 2, 1992 [KR] Rep. of Korea .................. 92-20412

[51] Int. Cl.$^6$ ...................................................... H04J 3/16
[52] U.S. Cl. .............................................. 370/79; 370/110.1
[58] Field of Search ............................. 370/79, 60, 94.1, 370/85.1, 110.1, 24, 93; 379/93, 165, 166, 418; 375/222

[56] References Cited

U.S. PATENT DOCUMENTS

| | | | |
|---|---|---|---|
| 5,134,611 | 7/1992 | Steinka et al. | 370/79 |
| 5,184,348 | 2/1993 | Abdelmouttalib et al. | 370/110.1 |
| 5,305,312 | 4/1994 | Fornek et al. | 370/79 |
| 5,371,740 | 12/1994 | Mouro et al. | 370/85.1 |

*Primary Examiner*—Douglas W. Olms
*Assistant Examiner*—Shick Hom
*Attorney, Agent, or Firm*—Morgan & Finnegan, L.L.P.

[57] ABSTRACT

A communication line adapter to enable simultaneous communication with the main controller and a plurality of terminals comprising an interface controller for interfacing digital command and data between the main controller and the public telephone network; a HDLC controller connected between the main controller and the interface controller for interfacing packeted digital command and data between the main controller and the interface controller in response to a periodic call of the main controller; a modem connected between the interface controller and the public telephone network for modulating to analog signal the digital data to be transmitted from the interface controller to the public telephone network and demodulating analog signal supplied from the public telephone network to digital command and data to be transmitted to the interface controller; a serial controller connected between the modem and the interface controller for converting into serial type, digital command and data to be transmitted from the interface controller to the modem, and converting into parallel type, serial digital command and data to be transmitted from the modem to the interface controller; a DTMF transmitter for encoding a phone number supplied from the interface controller to a DTMF signal and transmitting the encoded DTMF signal to the public telephone network; and a ring detector for detecting a ring signal from the public telephone network to supply the detected ring signal to the interface controller, whereby independently communicating with the main controller and a terminal connected to the public telephone network.

6 Claims, 7 Drawing Sheets

COMMUNICATION LINE ADAPTER AND THE METHOD THEREOF

BACKGROUND OF THE INVENTION

The present invention relates to a communication line adapter and the method thereof that adapts a main controller including data base and a computer to a public telephone network to communicate with a plurality of terminals connected to the public telephone network.

A general main controller such as data base and computer system needs a communication device such as a modem to communicate data with a remote terminal connected via a public telephone network and control the terminal. However, the communication device has to keep being connected to a main controller to match the main controller to the public telephone network, so that the main controller cannot communicate with a plurality of terminals. The problem of the above communication device is described with reference to FIG. 1.

With reference to FIG. 1, a communication device including a modem, connected between a computer system and a public telephone network 11 is shown. The communication device modulates digital control command and digital data supplied from the computer system 10 into analog signal, and transmits the modulated analog signal to a terminal (not shown) via the public telephone network 11. The communication device 12 demodulates the digital data included in the analog signal coming from the terminal through the public telephone network 11 and transmits the demodulated digital data to the computer system 10. The conventional communication adapter including the modem has to keep being connected to the computer system 10 to modulate the digital data and demodulate the digital data loaded on the analog signal, so that it makes the main controller not be communicated with the plurality of terminals. The conventional communication device cannot communicate with the terminal when the transmission speed of terminal is not equal to that of communication device or when a modem is not included in the terminal.

SUMMARY OF THE INVENTION

Accordingly, it is a first object of the present invention to provide a communication line adapter and the method thereof that can match a main controller and a public telephone network to enable simultaneous communication between a main controller and a plurality of terminals.

It is a second object of the present invention to provide a communication line adapter that can match a main controller and a public telephone network to enable communication between a terminal having no modulator demodulator and a main controller.

It is a third object of the present invention to provide a communication line adapter that can adapt a main controller to a public telephone network, regardless of a transmission speed of the terminal.

To achieve the first object, the communication line adapter of the present invention comprises: interface control means for interfacing digital command and data between a main controller and a public telephone network; HDLC control means coupled between the main controller and the interface control means for interfacing digital command and data in units of packet between the main controller and the interface control means in response to a periodic call of the main controller; modulation/demodulation means coupled between the interface control means and the public telephone network for modulating to analog signal the digital data to be transmitted from the interface control means to the public telephone network and demodulating analog signal supplied from the public telephone network to digital command and data to be transmitted to the interface control means; serial control means coupled between the modulation/demodulation means and the interface control means for converting into serial type, digital command and data to be transmitted from the interface control means to the modulation/demodulation means, and converting into parallel type, serial digital command and data to be transmitted from the modulation/demodulation means to the interface control means; DTMF transmission means for encoding a phone number supplied from the interface control means to a DTMF signal and transmitting the encoded DTMF signal to the public telephone network; and ring detection means for detecting a ring signal from the public telephone network to supply the detected ring signal to the interface control means.

To achieve the second object, the communication line adapter of the present invention further comprises a DTMF reception means for decoding digital data from the DTMF signal supplied from a terminal connected to the public telephone network and transmitting the decoded digital data to the interface control means, where the DTMF transmission means encodes the digital command and data supplied from the interface control means into a DTMF signal to transmit the encoded DTMF signal to the terminal connected to the public telephone network.

To achieve the third object, the communication line adapter of the present invention makes the interface control means control a transmission speed of the modulation/demodulation means according to a frequency of carrier signal supplied from the terminal connected to the public telephone network, to match the transmission speed of the modulation/demodulation to the terminal To achieve the first object, the communication line adapting method of interfacing the main controller with the terminal connected to the public telephone network comprises the steps of: converting into a communication standby mode in response to an initial operation command supplied from the main controller; detecting that packet data including a phone number of terminal, and digital data and command, supplied from the main controller and a ring signal from the public telephone network are received; forming a loop of the public telephone network if the ring signal has been received, receiving digital data from the terminal and opening the loop of the public telephone network; setting a mode of transmitting digital data received from the terminal to the main controller; checking whether a transmission mode of data to be transmitted to the main controller is set, if packet data is received from the main controller; packeting digital data received from the terminal and transmitting the packeted data to the main controller; forming a loop of the public telephone network and calling a terminal corresponding to the phone number included in the packet data; receiving digital data from the called terminal, sequentially transmitting digital data and command included in the packet data to the called terminal, and opening the loop of the public telephone network; and setting a mode of transmitting digital data received from the called terminal to the main controller.

BRIEF DESCRIPTION OF THE DRAWINGS

The above objects and other advantage of the present invention will become more apparent by describing the preferred embodiments of the present invention with reference to the attached drawings, in which.

DETAILED DESCRIPTION OF THE INVENTION

Figures 1, 2:
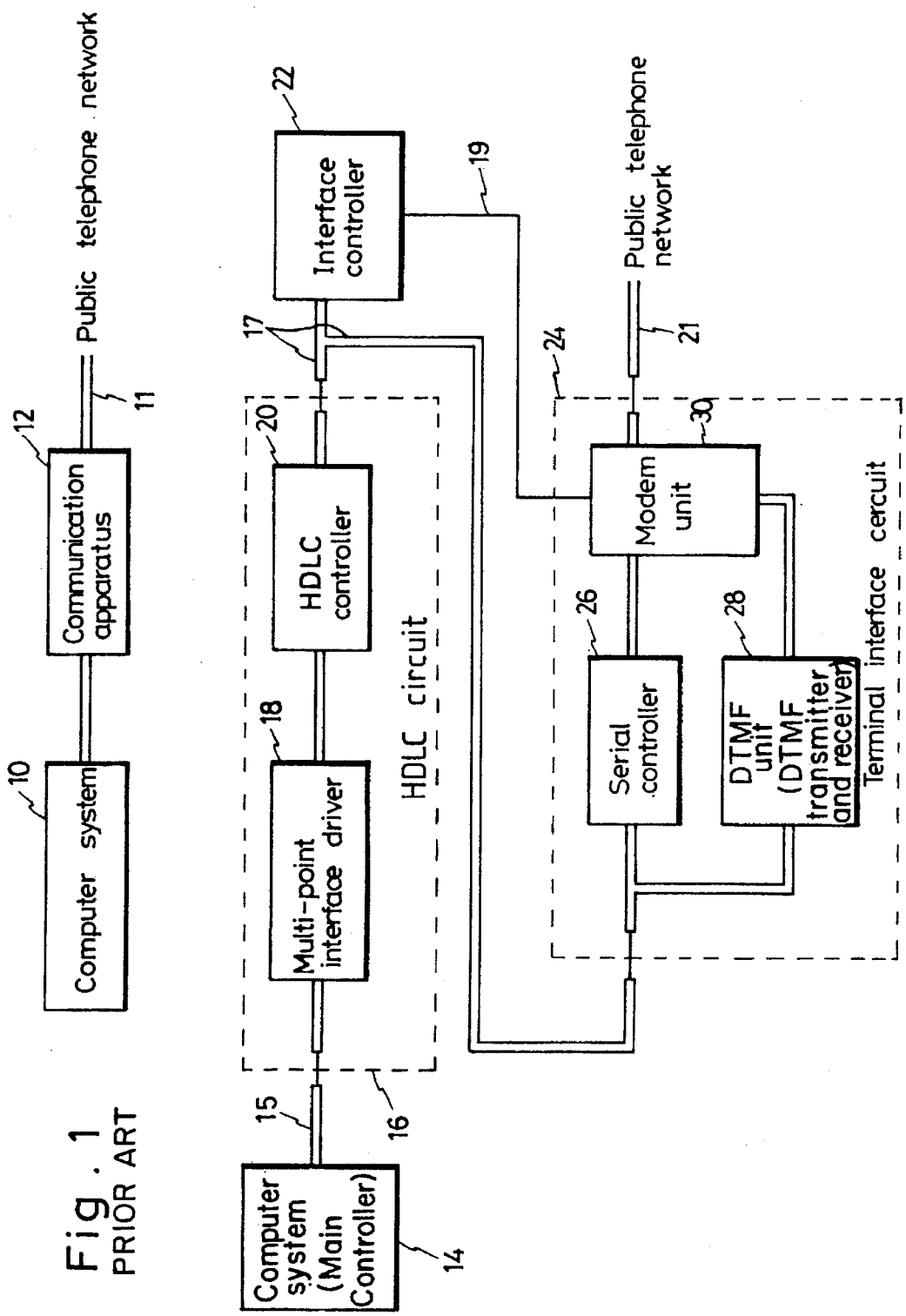
FIG. 1 illustrate how a communication device for adapting a computer system to a public telephone network is connected.
FIG. 2 is a block diagram of a communication line adapter according to an embodiment of the present invention.

FIG. 2 illustrates a communication line adapter according to an embodiment of the present invention, that has a high level data interface (hereinafter referred to as "HDLC") circuit 16 connected to a computer system 14 via a multipoint bus 15, and an interface controller 22 connected to the HDLC circuit 16 through an interface bus 17. The HDLC circuit 16 transmits to the interface controller 22 the command and data in units of packet received from the computer system 14 via the multipoint bus 15, and packets a plurality of commands and data received from the interface controller 22 via the interface bus 17 to transmit the packeted data to the computer system 14. To perform duplex transmission of the data in units of packet, the HDLC circuit 16 has a multipoint interface driver 18 connected to the multipoint bus 15, and also a HDLC communication controller 20 connected between the multipoint interface driver 18 and the interface bus 17. The multipoint interface driver 18 transmits to the HDLC communication controller 20 the data frame received via the multipoint bus 15, and transmits the data frame from the HDLC communication interface 20 to the multipoint bus 15. When a selection address included in the data frame coming from the multipoint bus 15 is equal to its own inherent address, the HDLC communication controller 20 separates command and data in units of packet included in the data frame and transmits the separated command and data packets to the interface controller 22 via the interface bus 17. The HDLC communication controller 20 packets the command and data received from the interface controller 22 via the interface bus 17, and assigns its own inherent address and signaling bit to the packeted command and data to form a data frame. Also, the HDLC communication controller 20 transmits the formed data frame to the computer system 14 via the multipoint interface driver 18 and the multipoint bus 15. For the construction of data frame and the separation of command and data formed in units of packet from the data frame, the HDLC communication controller 20 has a direct memory accessor (hereinafter refer to as "DMA") for accessing a memory included in the interface controller 22, a buffer for temporarily storing I/O signal of HDLC, and a microprocessor.

The communication line adapter additionally has a terminal interface circuit 24 between the interface bus 17 and the public telephone network 21 for interfacing data communication with the interface controller 22 and terminal equipment (not shown) connected to the public telephone network 21. The terminal interface circuit 24 modulates the digital command and data from the interface controller 22 into analog signal, or encodes the digital command and data into DTMF(Dual Tone Multi-Frequency) signal, to send the modulated signal or the encoded signal to terminal connected to the public telephone network. The terminal interface circuit 24 demodulates the analog signal supplied from the public telephone network 21 into digital command and data or decodes the DTMF signal from the public telephone network 21, to generate digital command and data. Also, for modulating/demodulating the analog signal and encoding/decoding the DTMF signal, the terminal interface circuit 24 has a serial controller 26 and a DTMF unit 28, both commonly connected to the interface controller 22 via the interface bus 17, and a modem 30 connected between the public telephone network 21, and the serial controller 26 and the DTMF unit 28. The serial controller 26 converts the digital command and data supplied from the interface controller 22 into serial type to supply the serial type to the modem 30, and converts the demodulated digital command and data of serial type from the modem 30 into parallel data to supply the parallel data to the interface controller 22 via the interface bus 17. The DTMF unit 28 includes a DTMF transmitter (not shown) and a DTMF receive (not shown). The DTMF transmitter encodes a phone number of terminal from the interface controller 22 and digital data to be transmitted, into a DTMF signal and transmits the encoded DTMF signal to terminal via the modem 30 and the public telephone network 21. The DTMF receiver decodes the DTMF signal received via the public telephone network 21 and the modem 30 to generate digital command and data, and supplies the generated digital command and data to the interface controller 22 via the interface bus 17. The modem 30 performs modulation/demodulation in response to a control signal supplied via a mode control line 19 from the interface controller 22 or interfaces communication of DTMF signal between the public telephone network 21 and the DTMF Unit 28. In modulation/demodulation mode, the modem 30 modulates digital data of serial type from the serial controller 26 into analog signal type, to transmit the modulated analog signal to the terminal via the public telephone network 21, and demodulates the analog signal from the public telephone network 21 into digital command and data of serial type to supply the demodulated digital command and data to the serial controller 26. The modem 30 detects a frequency of a carrier signal included in the analog signal from the public telephone network 21 and supplies the detected frequency to the interface controller 22 via the serial controller 26 and the interface bus 17. Also, the modem 30 transmits the digital data at a transmission speed assigned by the transmission speed adjusting signal supplied via the control line 19. Meanwhile, in a DTMF signal transmission mode, the modem 30 transmits to the public telephone network 21 the DTMF signal supplied from the DTMF transmitter of the DTMF unit 28, and transmits to the DTMF receiver of the DTMF unit 28 the DTMF signal supplied from the public telephone network 21. The modem 30 detects a ring signal from the public telephone network 21 to supply the ring detection signal to the interface controller 22, and hooks on/off the loop of the public telephone network 21 in response to a speech path control signal supplied through the control line 19 from the interface controller 22.

When a transmission requiring command with the digital command and data to be transmitted are received from the computer system 14 via the multipoint bus 15, the HDLC circuit 16, and the interface bus 17, the interface controller 22 controls the modem 30 to form a loop of the public telephone network 21 and supplies the phone number of terminal to be communicated, to the DTMF transmitter of the DTMF unit 28. The interface controller 22 supplies the digital data and command supplied from the computer system 14, to the Serial controller 26 or the DTMF transmitter of the DTMF unit 28, so that the digital command and data is transmitted to the terminal connected to the public telephone network 21. Also, the interface controller 22 receives the digital command and data from the public telephone network 21 via the modem 30 and the serial controller 26, or via the modem 30 and the DTMF receiver of the DTMF unit 28. When a ring detection signal is received from the modem 30 via the control line 19, the interface controller 22 controls the modem 30 to form the loop of the public telephone network 21, and receives via the modem 30 and the serial controller 26, or via the modem 30 and the DTMF unit 28 the digital command and data transmitted from the terminal via the public telephone network 21. When the command and data are received via the multipoint bus 15, the multipoint interface driver 18, and the HDLC controller 20 from the computer system 14, the interface controller 22 transmits the digital command and data received from the public telephone network 21, to the computer system 14. The interface controller 22 has a memory element for temporarily storing the digital data and command, received from the computer system, that will be transmitted to the terminal, and temporarily storing the digital data and command that will be transmitted from the terminal to the computer system 14, and also has registers for recording other operation modes and control states.

Figure 3:
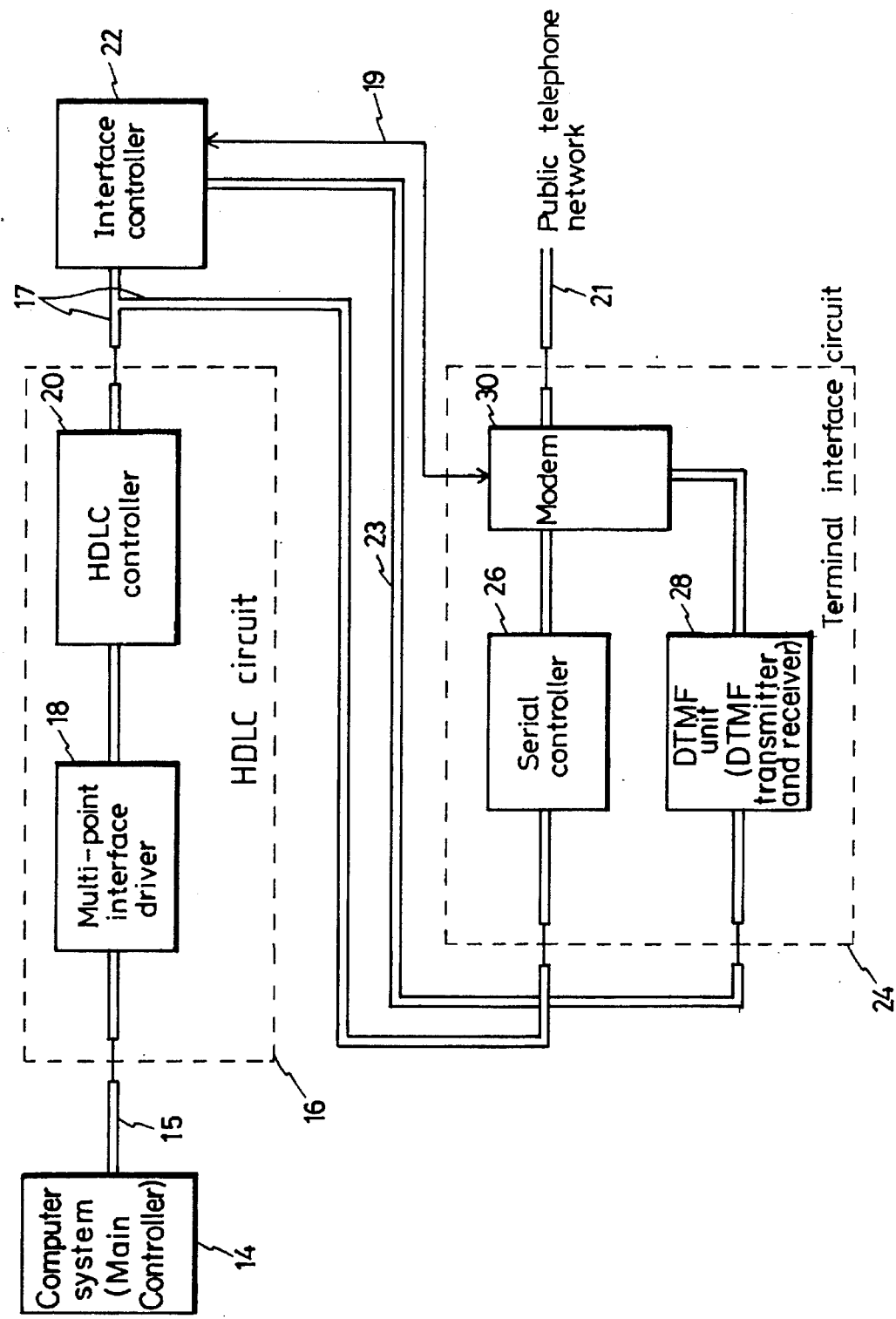
FIG. 3 is a block diagram of a communication line adapter according to another embodiment of the present invention.

FIG. 3 illustrates a communication line adapter according to another embodiment of the present invention. The communication line adapter shown in FIG. 3 comprises the elements having the same function and numerals as the communication line adapter shown in FIG. 2, except that the serial controller 26 is connected to the interface controller 22 via the first interface bus 17 and the DTMF unit is connected to the interface controller 22 via the second interface bus 23 of serial type. The first interface bus 17 is provided as a transmission path of digital data and command between the serial controller 26 and the interface controller 22 when the digital command and data are transmitted/received in the form of analog signal. The second interface bus 23 is provided as a transmission path between the interface controller 22 and the DTMF unit 28 when the phone number is transmitted and the digital command and data are transmitted/received in the form of DTMF signal. The detailed description of the elements except for the first and second interface buses 17 and 23 shown in FIG. 3 is emitted because the elements have the same function and operation as the elements of FIG. 2.

Figure 4A:
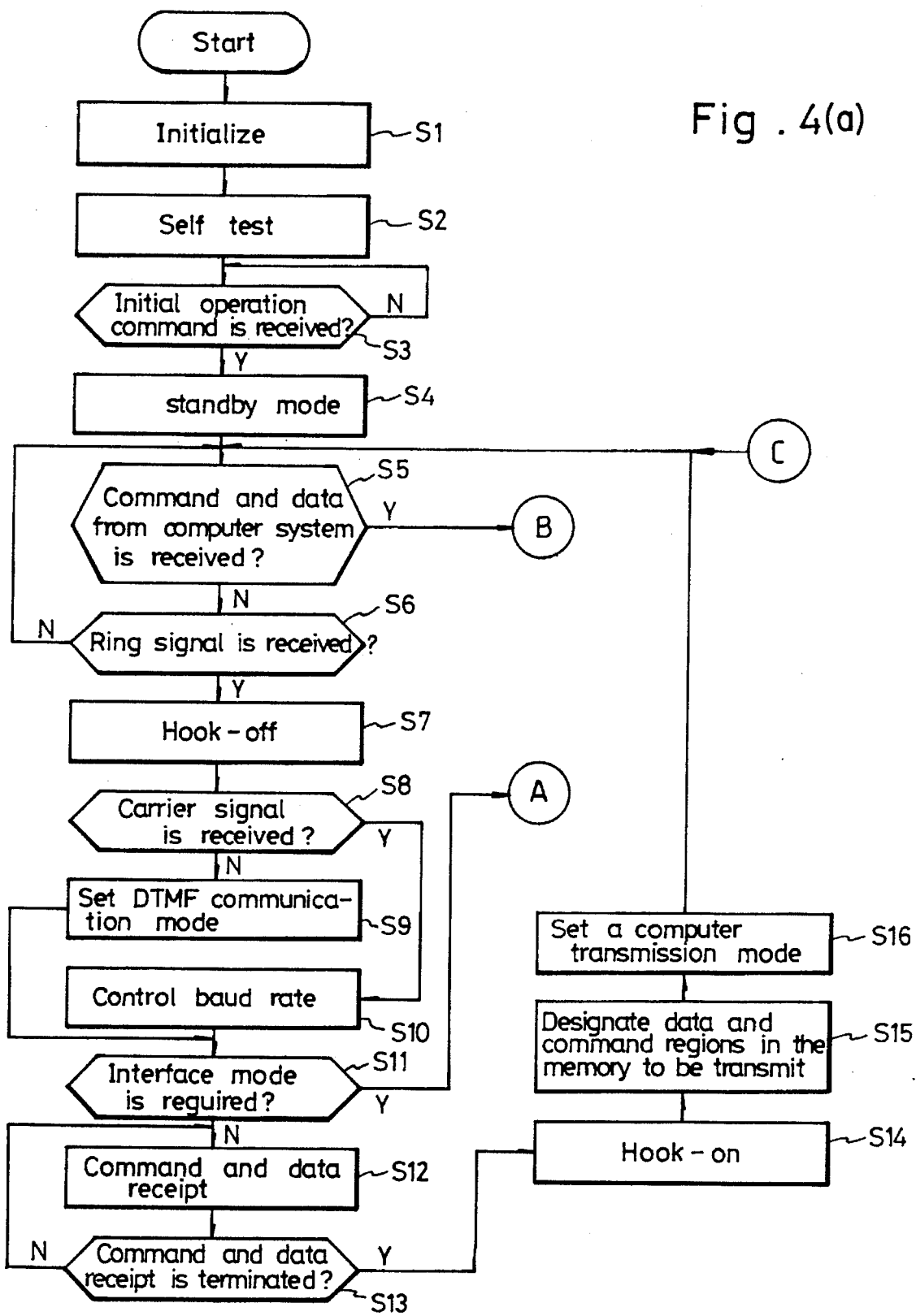
FIG. 4(a), FIG. 4(b) and FIG. 4(c) a flow chart of a communication line adapting method according to the embodiment of the present invention.
Figure 4B:
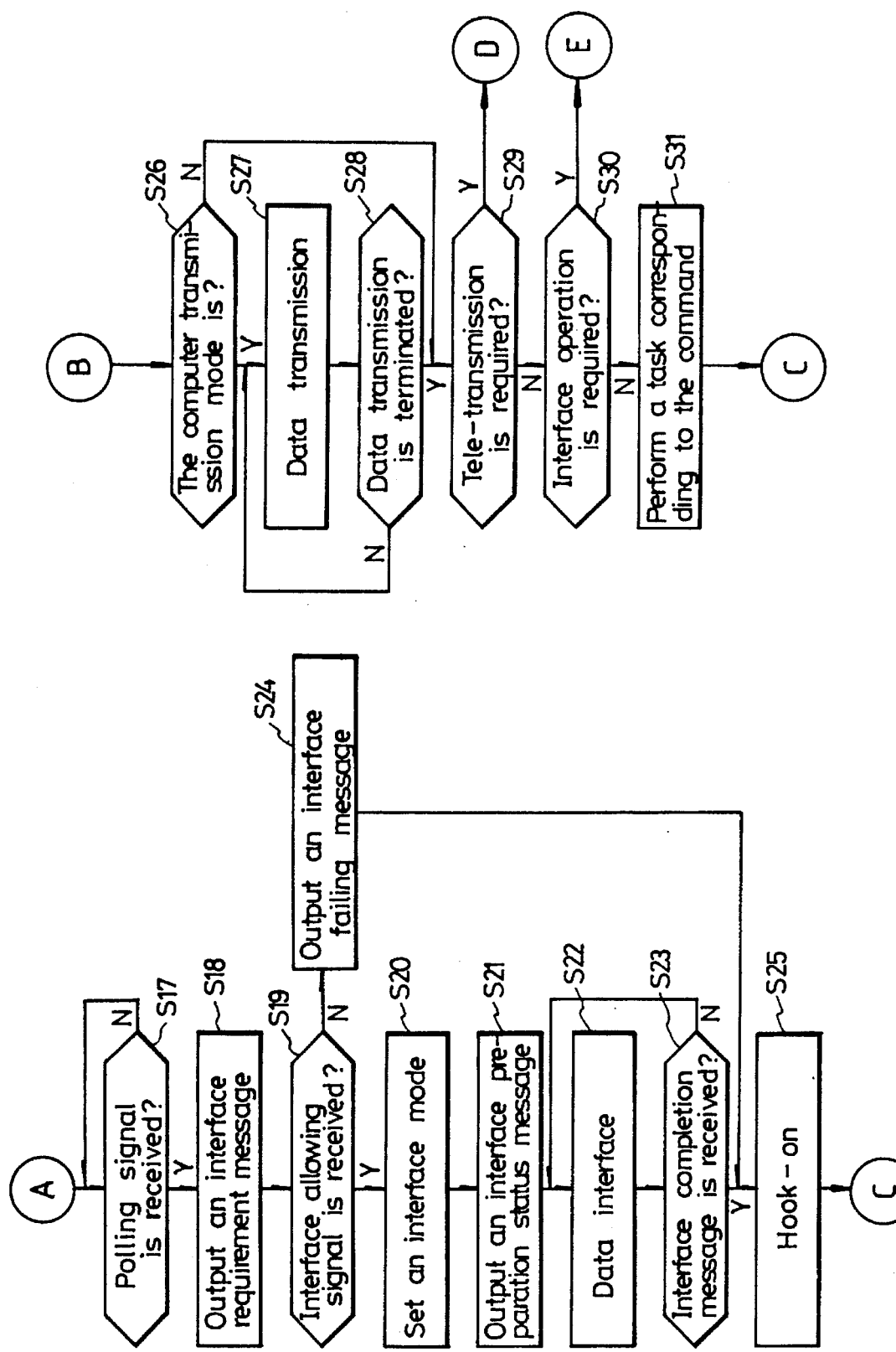
Figure 4C:
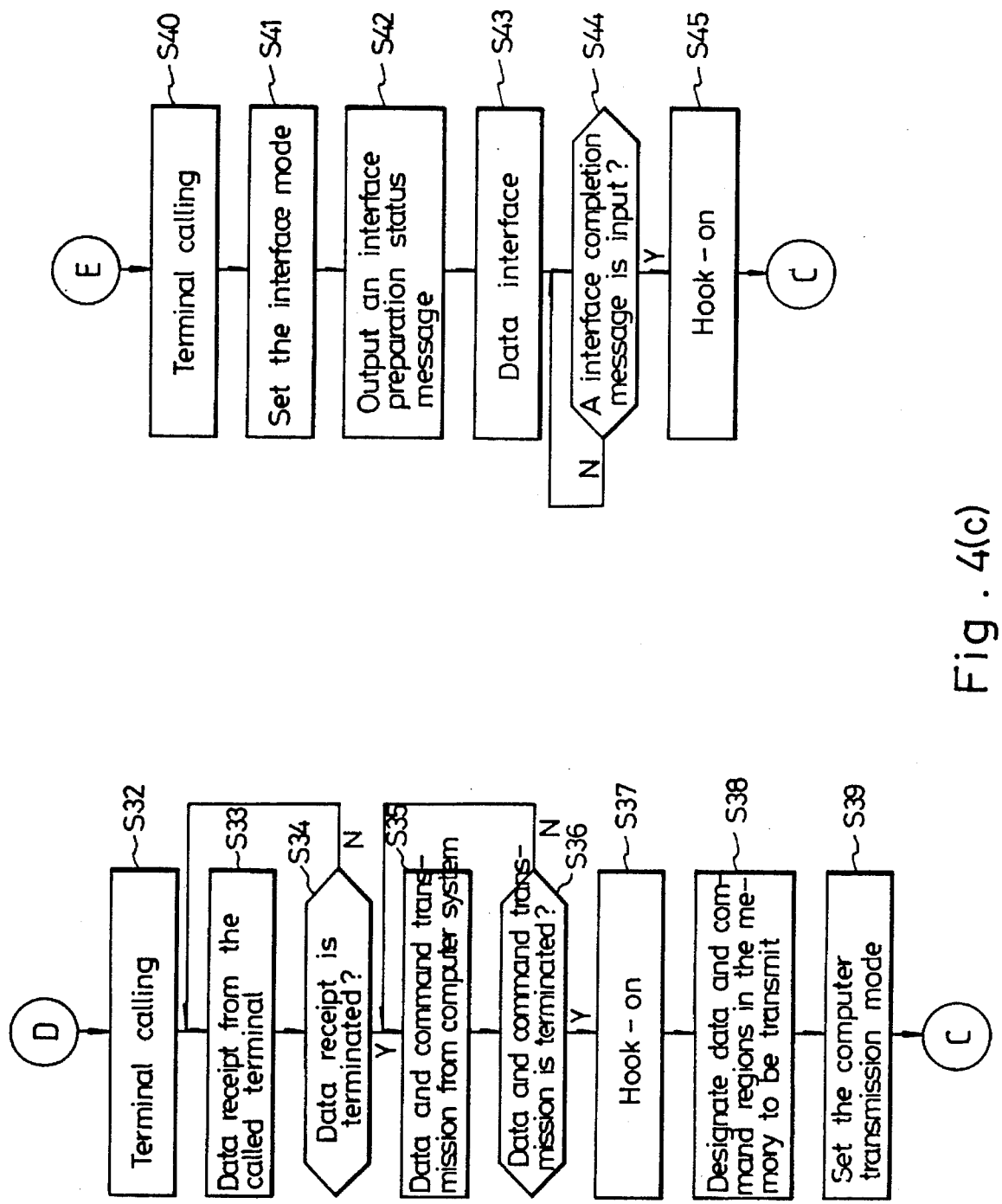

FIG. 4(a), FIG. 4(b), and FIG. 4(c) are a flow chart of a communication line adapting method according to the embodiment of the present invention performed by the interface controller 22 shown in FIGS. 2 and 3. FIG. 4(a), FIG. 4(b), and FIG. 4(c) are described in detail with the communication line adapter shown in FIG. 2.

The interface controller 22 initiates its own registers and memory when power is turned on (in step S1). After performing step S1, the interface controller 22 sends test data to the multipoint interface driver 18 via the HDLC controller 20, and checks data fed-back via the HDLC controller 20 from the multipoint interface driver 18 to test the presence of error in communication patch between the public telephone network 21 and the interface controller itself. The interface controller 22 sends test data to the modem 30 via the serial controller 26, and checks the data fed-back via the serial controller and the DTMF unit 28 from the modem 30 to test the presence of error in communication path between the public telephone network 21 and the interface controller itself (in step S2). After performing step S2, the interface controller 22 is in stand-by until an initial operation command is received via the multipoint bus 15, the multipoint interface driver 18, the HDLC controller 20 and the interface bus 17 from the computer system 14 (in step S3). If an initial operation command has been received in step S3, the interface controller 22 sets to "1" the communication standby mode flag assigned to its own register to set a communication standby mode (in step S4).

After performing step S4, the interface controller 22 checks whether command and transmission data are received via the multipoint bus 15, the multipoint interface driver 18, the HDLC controller 20 and the interface bus 17 from the computer system 14 (in step S5). If the command and transmission data has not been received from the computer system 14 in step S5, the interface controller 22 checks whether a ring detection signal received via the control line 19 from the modem 30 (in step S6). If the ring detection signal has been received in step S6, the interface controller 22 supplies a speech path control signal of high logic to the modem 30 via the control line 19 to make the modem 30 hook-off the public telephone network 21 (in step S7). After performing step S7, the interface controller 22 checks whether the frequency value of carrier signal received via the serial controller 26 and the interface bus 17 from the modem 30 is "0", to determine whether the terminal requiring the communication has a modem or what a transmission speed of the modem provided in the terminal is (in step S8). If the frequency of carrier signal has been the value "0" in step S8, the interface controller 22 sets to "1" the DTMF communication mode flag assigned to its own register, to set a DTMF communication mode (in step S9). Contrarily, If the frequency of the carrier signal has not been "0" in step S8, the interface controller 22 sets to "1" a modem communication mode flag instead of the DTMF communication mode flag assigned to its own register, to set a modem communication mode. The interface controller 22 supplies a transmission speed adjusting signal corresponding to the frequency of the carrier signal, to the modem 30 via the control line 19, thereby adjusting the transmission speed of the modem 30 (in step S10). After performing step S9 or S10, the interface controller 22 checks whether an interface communication requiring message is received from the terminal connected to the public telephone network 21, via the modem 30, the serial controller 26 or the DTMF receiver of the DTMF unit 28, and the interface bus 17 (in step S11). If the interface communication message has not been received in step S11, the interface controller 22 receives the digital command and data from the terminal connected to the public telephone network 21 and stores the received digital command and data in its own memory (in step S12). After performing step S12, the interface controller 22 checks whether a message completion signal is received from the terminal connected to the public telephone network 21, and loops back to step S12 if the message completion signal has not been received (in step S13). If the message completion signal has been received in step S13, the interface controller 22 supplies a speech path control signal of low logic to the modem 30 via the control line 19, to make the modem 30 hook-on the public telephone network 21 (in step S14). After performing step S14, the interface controller 22 registers in its own register, as a message to be transmitted to the computer system 14, the region of the digital command and data supplied from the terminal and stored in its own memory (in step S15). After performing step S15, the interface controller 22 sets to "1" the computer message transmission mode flag assigned to its own register, to set a mode of transmitting a message to the Computer system 14 (in step S16).

Meanwhile, if the interface communication requiring message has been received in step S11, the interface controller 22 awaits until a polling signal is supplied from the computer system 14 (in step S17). If the polling signal has been received in step S17, the interface controller 22 transmits the transmission communication requiring message from the terminal to the computer system 14 via the interface bus 17, the HDLC controller 20, the multipoint interface driver 16 and the multipoint bus 15 (in step S18), and awaits until an interface communication permitting signal is received from the computer system 14 (in step S19). If the interface communication permitting signal has been received in step S19, the interface controller 22 sets to "1" the interface communication mode flag to set an interface communication mode (in step S20), and sends to the computer system 14 the interface communication ready message indicating that the preparation for interface communication is completed (in step S21). After performing step S21, the interface controller 22 sends the digital command and data received via the multipoint bus 15, the multipoint interface driver 18, the HDLC controller 20, and the interface bus 17 from the computer system 14, to the terminal via the serial controller 26, the modem 30 and the public telephone network 21 or via the DTMF unit, the modem 30 and the public telephone network 21. The interface controller 22 sends the digital command and data supplied from the terminal, to the computer system 14 (in step S22). During performing step S22, the interface controller 22 awaits until an interface communication completion message generated in the computer system 14 or an interface communication completion message generated in the terminal is received (in step S23 ). Meanwhile, if the interface communication permitting signal has not been received from the computer system 14 in step S19, the interface controller 22 generates an interface communication failing message to send the generated message to the terminal connected to the public telephone network 21 (in step S24). After step S24 is performed or if the interface communication completion message has been received in step S23, the interface controller 22 resets the interface communication mode flag assigned to its own register to "0", to release the interface communication mode. The interface controller 22 supplies a speech path control signal of low logic to the modem 30 via the control line 19, to make the modem 30 hook-on the public telephone network 21 (in step S25).

If the presence of digital command and data supplied from the computer system 14 and stored in its own memory has been detected by the HDLC controller 20 in step S5, the interface controller 22 checks whether the computer message transmission mode flag assigned to its own register is set to "1", to determine whether there is a message to be sent to the computer system 14 (in step S26). If the computer message transmission mode flag has been set to "1" in step S26, the interface controller 22 sequentially transmits to the computer system 14 the digital command and data on its own memory stored in the transmission message region registered in its own register (in step S27). After performing step S27, the interface controller 22 awaits until the digital data stored in the final address of the message region to be transmitted is transmitted from the terminal (in step S28). If the digital command and data to be transmitted to the computer system 14 has been all transmitted in step S28, or if the computer message transmission mode flag has been "0" in step S26, the interface controller 22 resets the computer message transmission mode: flag to "0", and checks whether the input command in step S5 is a remote transmission requiring message or an interface communication requiring message (in steps S29 and S30). If the command from the computer system 14 has not been a remote transmission requiring message and an interface communication requiring message in steps S29 and S30, the interface controller 22 performs the task corresponding to the input command and then loops back to step S5 (in step S31).

If the command from the computer system 14 has been a remote transmission requiring message in step S29, the interface controller 22 supplies a speech path control signal of high logic to the modem 30 via the control line 19 and also supplies the terminal's phone number received from the computer system 14 the interface bus 17 to the DTMF transmitter of the DTMF unit 28, to form a loop of the public telephone network 21 (in step S32). After performing step S32, the interface controller 22 receives the digital command and data from the called terminal and stores the received digital command and data in its own memory (in step S33). After performing step S33, the interface controller 22 checks whether a message completion signal has been received from the called and connected terminal, and goes back to step S33 if the message completion signal has not been received (in step S34). If the message completion signal has been received in step S34, the interface controller 22 sequentially reads out the digital command and data supplied from the computer system 14 and stored in its own memory and transmits the read digital command and data to the called terminal (in step S35). After performing step S35, the interface controller 22 checks whether the end of digital command and data is transmitted from the computer system 14 (in step S36). If the end of digital command and data has been transmitted from the computer system 14 to the called terminal in step S36, the interface controller 22 supplies a speech path control signal of low logic to the modem 30 via the control line 19, to make the modem 30 hook-on the public telephone network 21 (in step S37). After performing step S37, the interface controller 22 registers the region of digital command and data supplied from the called terminal and stored in its own memory, as a message to be transmitted to the computer system 14, in its own register (in step S38). After performing step S38, the interface controller 22 sets to "1" the computer message transmission mode flag assigned to its own register, to set a mode of transmitting a message to the computer system 14 (in step S39)

Also, if the command from the computer system 14 has been an interface communication requiring message in step S30, the interface controller 22 supplies a speech path control signal of high logic to the modem 30 via the control line 19, and also supplies the terminal's phone number received from the computer system 14, via the interface bus 17 to the DTMF transmitter of the DTMF unit 28, to form a loop of the public telephone network 21 (in step S40). After performing step S40, the interface controller 22 sets to "1" the interface communication mode flag to set an interface communication mode (in step S41), and sends to the computer system 14 an interface communication ready message indicative of being ready for interface communication (in step S42). After performing step S42, the interface controller 22 sends the digital command and data received via the multipoint bus 15, the multipoint interface driver 18, the HDLC controller 20 and the interface bus 17 from the computer system 14, to the terminal via the serial controller 26, the modem 30 and the public telephone network 21, or via the DTMF unit, the modem 30 and the public telephone network 21. The interface controller 22 sends the digital command and data supplied from the terminal, to the computer system 14 (in step S43). Also, during performing step S43, the interface controller 22 awaits until the interface communication completion message generated in the computer system 14 or the interface communication completion message generated in the terminal is received (in step S44). If the interface communication completion message has been received in step S44, the interface controller 22 resets to "0" the interface communication mode flag assigned to the its own register, to release the interface communication mode. The interface controller 22 supplies a speech path control signal of low logic to the modem 30 via the control line 19, to make the modem 30 hook-on the public telephone network 21 (in step S45).

Figure 5:
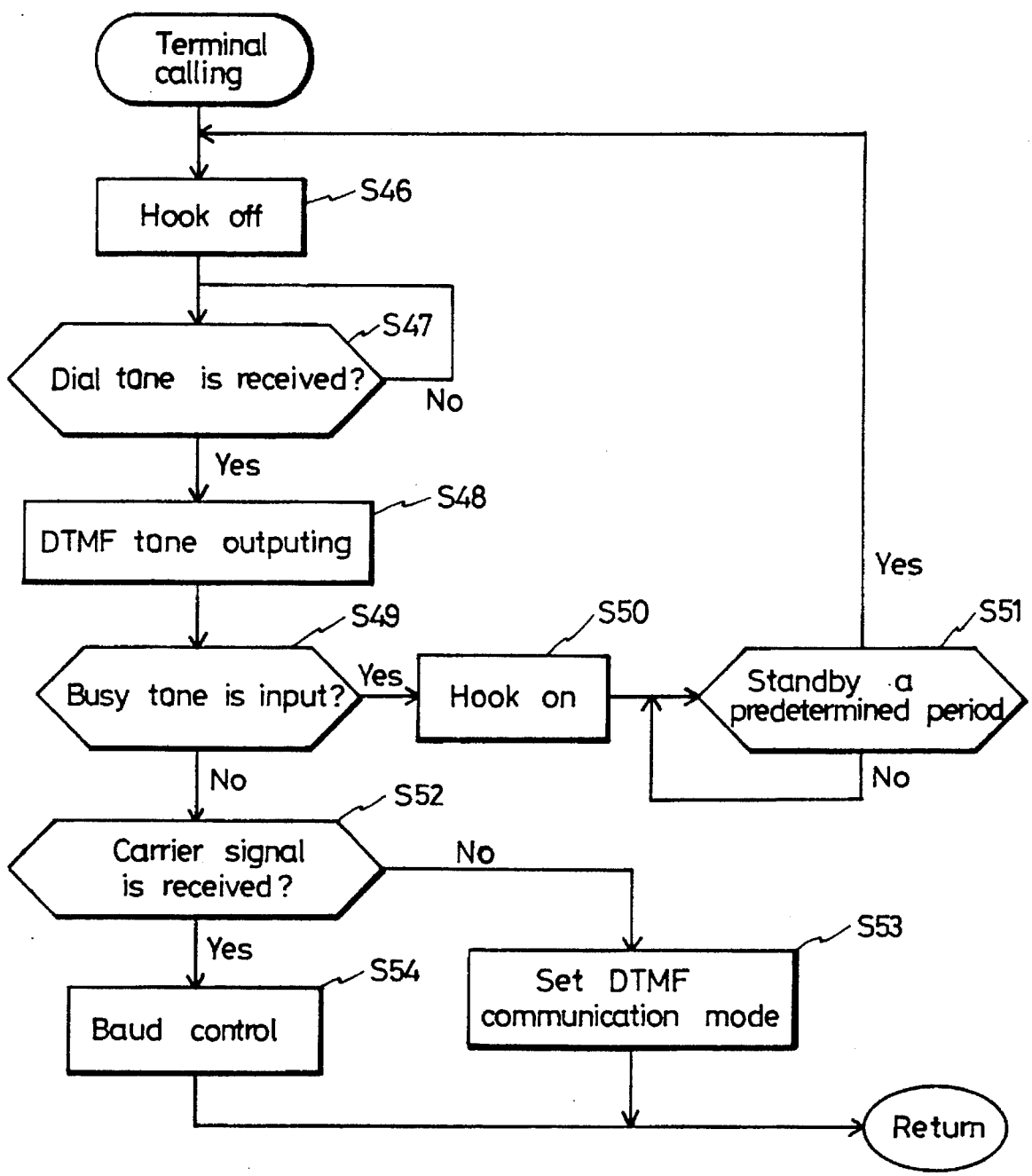
FIG. 5 is a detailed flow chart for a part shown in FIG. 4(a)-4(c)

FIG. 5 is a detailed flow chart for the terminal calling process shown in FIG.4(c), which is described in detail as follow.

The interface controller 22 supplies a speech path control signal of high logic to the modem 30 via the control line 19, to make the mode 30 hook-off the public telephone network 21 (in step S46). After performing step S46, the interface controller 22 awaits until a dial tone detection signal is received via the control line 19 from the modem 30 (in step S47). If the dial tone detection signal has been received in step S47, the interface controller 22 supplies the phone number of terminal to be called, supplied from the computer system and stored in its own memory, to the DTMF transmitter of the DTMF unit 28 via the interface bus 17, to make the DTMF transmitter send the DTMF signal corresponding to the phone number of the terminal to be called, to the public telephone network 21 via the modem 30 (in step S48). After performing step S48, the interface controller 22 checks whether a busy tone detection signal is received via the control line 19 from the modem 30 (in step S49). If the busy tone detection signal has been received in step S49, the interface controller 22 supplies a speech path control signal of low logic to the modem 30 via the control line 19, to make the modem hook-on the public telephone network 21 (in step S50). After performing step S50, the interface controller 22 awaits for a predetermined time period, and then goes back to step S46 (in step S51). Meanwhile, if the busy tone detection signal has not been received in step S49, the interface controller 22 checks whether the frequency value of carrier signal received via the serial controller 26 and the interface bus 17 from the modem 30 is "0", to determine that the terminal requiring communication has a modem and what the transmission speed of the modem provided in the terminal is (in step S52). If the frequency of the carrier signal has been "0", in step S52, the interface controller 22 sets to "1" the DTMF communication mode flag assigned to its own register, to set a DTMF communication mode (in step S53). Contrarily, if the frequency of the carrier signal has not been "0" in step S52, the interface controller 22 sets to "1" the modem communication mode flag instead of the DTMF communication mode flag assigned to its own register, to set a modem communication mode. The interface controller 22 supplies a transmission speed adjusting signal corresponding to the frequency of carrier signal, to the modem 30 via the control line 19, to adjust the transmission speed of the modem 30 (in step S54).

Figure 6:
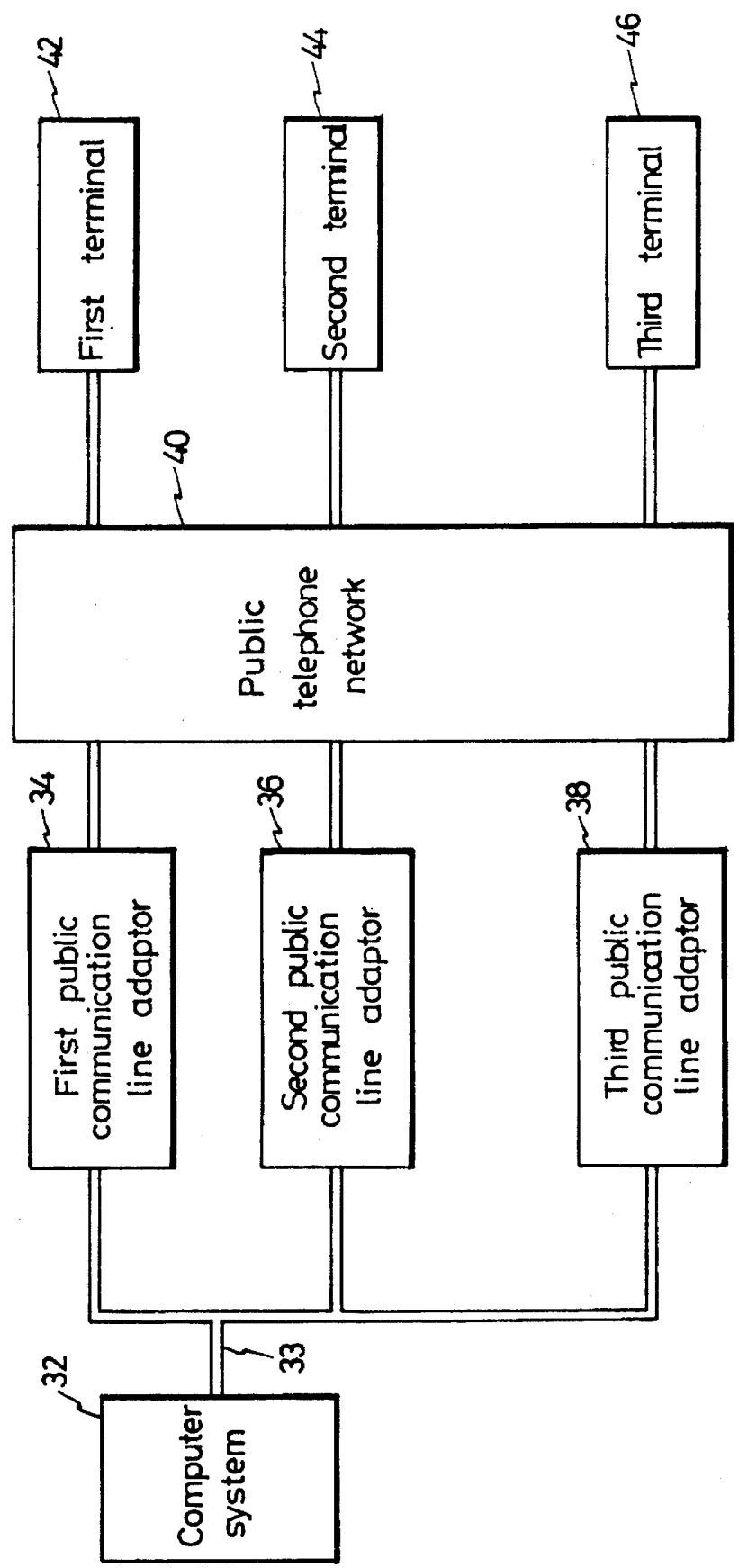
FIG. 6 illustrates a digital communication system where a communication line adapter is applied according to the embodiment of the present invention.

Turning now to FIG. 6, a digital communication system having first to third communication line adapters according to the present invention, commonly connected to a computer system 32 via a multipoint bus 33 is illustrated. The first to third communication line adapters 34 to 38 are connected to a public telephone network 40. First to third terminals 42 to 46 for communicating with the first to third communication line adapters 34 to 38 connected to the public telephone network 40 are connected to the public telephone network 40. The computer system 32 sequentially calls the first to third communication line adapters 34 to 38 with a predetermined time period, to send the digital command and data to be transmitted to the terminals 42 to 48, and the phone number of terminal. Accordingly, the communication line adapters transmit the digital command and data to the terminals having the phone number via the public telephone network 40. The computer system 32 sequentially and periodically calls the first to third communication line adapters 34 to 38 to receive the digital command and data that is received from the terminals in the communication line adapters. Also, the computer system 32 supplies a call signal with an inherent address given to the communication line adapters, to sequentially and periodically call the first to third communication line adapters 34 to 38. As described above, the present invention provides an advantage of improving the job processing capability of the main controller by communicating with the main controller such as a computer system, and terminals independently connected to the public telephone network. The present communication line adapter receives/transmits in the form of DTMF signal the digital command and data, thereby having an advantage of adapting the main controller to the terminal having no modem. Also, the communication line adapter of the present invention adaptively adjusts the transmission speed according to the transmission speed of the modem included in the terminal, so that the main controller can be adapted to the terminal regardless of the transmission speed of the terminal.

What is claimed is:

1. A communication line adapter for interfacing a terminal connected to a public telephone network with a main controller such as a computer system, comprising:

interface control means for interfacing digital command and data between said main controller and said public telephone network;

high level data interface control means coupled between said main controller and said interface control means for interfacing digital command and data in units of packet between said main controller and said interface control means in response to a periodic call of said main controller;

modulation/demodulation means coupled between said interface control means and said public telephone network for modulating into analog signal digital data to be transmitted from said interface control means to said public telephone network demodulating analog signal supplied from said public telephone network, into digital command and data to be transmitted to said interface control means, and detecting a ring signal from said public telephone network to supply the detected ring signal to said interface control means;

serial control means coupled between said modulation/demodulation means and said interface control means for converting into serial type, digital command and data to be transmitted from said interface control means to said modulation/demodulation means, and converting into parallel type, serial digital command and data to be transmitted from said modulation/demodulation means to said interface control means; and dual tone multifrequency transmission means for encoding a phone number supplied from said interface control means into a dual tone multifrequency signal and transmitting said dual tone multifrequency signal to said public telephone network.

2. A communication line adapter as claimed in claim 1, further comprising:

dual tone multifrequency reception means for decoding digital data from the dual tone multifrequency signal supplied from said terminal connected to said public telephone network, to transmit the decoded digital data to said interface control means, said dual tone multifrequency transmission means encoding the digital command and data supplied from said interface control means to a dual tone multifrequency signal, to transmit the dual tone multifrequency signal to said terminal coupled to said public telephone network.

3. A communication line adapter as claimed in claim 2, wherein said modulation/demodulation means interfaces a dual tone multifrequency signal between said public telephone network and said dual tone multifrequency transmission/reception means under the control of said interface control means and modulates/demodulates digital data transmitted between said serial control means and said public telephone network.

4. A communication line adapter as claimed in claim 3, wherein said modulation/demodulation means performs interface of said DTMF signal if a carrier signal is not received from said public telephone network.

5. A communication line adapter as claimed in claim 1, wherein said interface control means matches a transmission speed of said modulation/demodulation means to said terminal by controlling a transmission speed of said modulation/demodulation means according to a frequency of carrier signal from said terminal connected to said public telephone network.

6. A communication line adapting method for interfacing terminals coupled to a public telephone network, with a main controller such as a computer system, comprising the steps of:

converting into a communication standby mode in response to an initial operation command supplied from said main controller;

detecting that packet data including a phone number of a terminal, and digital data and command, supplied from said main controller, and a ring signal from said public telephone network via a modem are received;

forming a loop of said public telephone network by the modem if said ring signal has been received, receiving digital data from said terminal via the modem and opening the loop of said public telephone network by the modem, said modem modulating into analog signal digital data to be transmitted from said main controller to said public telephone network and demodulating the analog signal supplied from said public telephone network into digital command and data to be transmitted to said main controller, and detecting a ring signal from said public telephone network;

setting a mode of transmitting digital data received from said terminal, to said main controller;

checking whether a transmission mode of data to be transmitted to said main controller is set, if packet data is received from said main controller;

packeting digital data received from said terminal into packet data and transmitting said packet data to said main controller;

forming a loop of said public telephone network and calling a terminal corresponding to the phone number included in said packet data;

receiving digital data from said terminal corresponding to the phone number, sequentially transmitting digital data and command included in said packet data to said terminal corresponding to the phone number via the modem and said public telephone network, and opening the loop of said public telephone network by the modem; and setting a mode of transmitting digital data received from said terminal corresponding to the phone number to said main controller.

* * * * *